Nov. 26, 1935.  W. F. HOERLE  2,022,347
BALL BEARING SKATE WHEEL
Filed Dec. 2, 1933
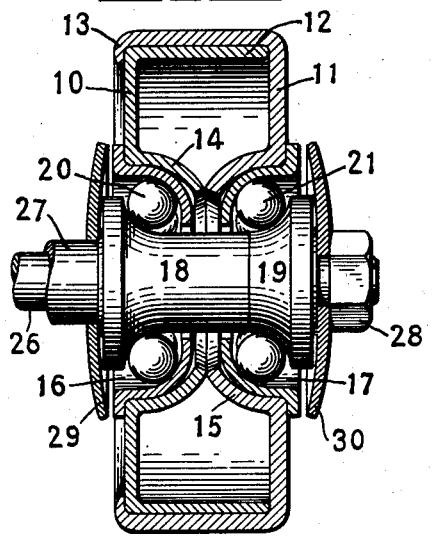
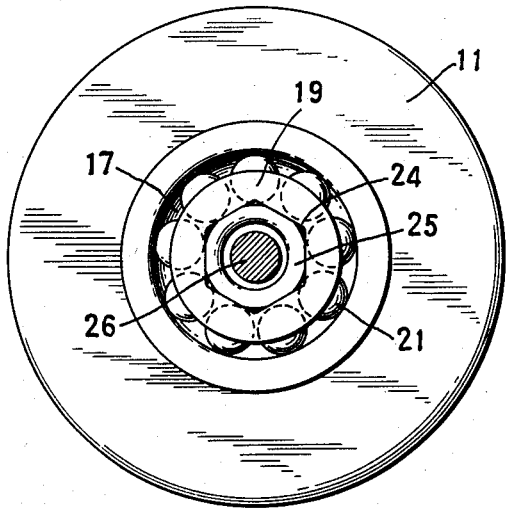
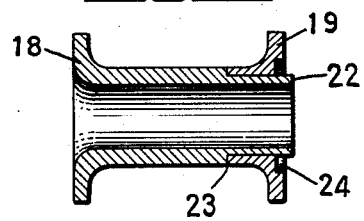
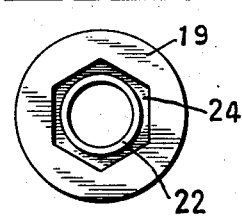
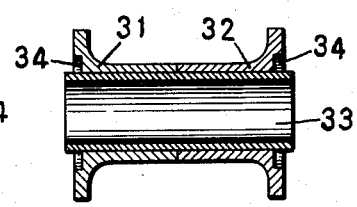
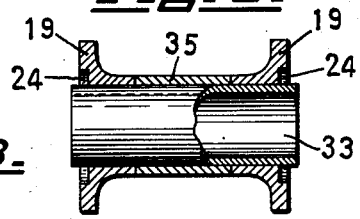
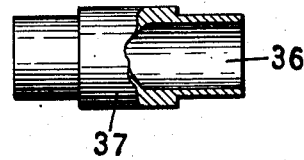
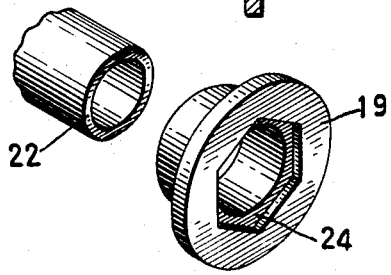
INVENTOR
William F. Hoerle
BY
ATTORNEY Patented Nov. 26, 1935

2,022,347

UNITED STATES PATENT OFFICE 2,022,347

BALL BEARING SKATE WHEEL

William F. Hoerle, Torrington, Conn., assignor to Union Hardware Company, Torrington, Conn., a corporation of Connecticut Application December 2, 1933, Serial No. 700,695

8 Claims. (Cl. 208—181)

My invention relates particularly to what are commonly termed roller skate wheels of the type of the Bryant and Hoerle Patent 1,330,579.

The object of the present invention is to provide a construction which can be made uniformly and cheaply and yet which is durable.

In carrying out the invention I provide two tubular bearing hub members which are connected by a tubular part upset into an angular recess in the outer face of one of the bearing parts. These bearing parts may be formed in different ways and the tubular connecting member may be integral with one part or formed separately. In the latter case both bearing parts will be provided with recesses in their outer faces to receive the upset ends of the tubular connecting member.

Fig. 1 shows the rotating parts of the wheel member in section and the hub member in side elevation.

Fig. 2 is a side view with the dust guard omitted.

Fig. 3 is a longitudinal sectional view of the parts of the hub member of Fig. 1 in the position which they occupy when assembled but before the tubular connector is upset.

Fig. 4 is an end view of the same.

Fig. 5 is a longitudinal sectional view of a modified form of hub construction.

Fig. 6 is a longitudinal section and side elevation of another modified form of hub construction.

Fig. 7 is a side view and partial section of a modified form of tubular portion for a hub.

Fig. 8 is a perspective view showing one of the tubular hub bearings and a fragment of tubular connector.

The rotor of the wheel consists of two web members 10 and 11 with interfitting flanges 12 and 13 which may be conveniently united or interlocked by spinning or turning over the edge of the flange 13. The web members have inturned socket portions 14 and 15 in which are rigidly secured or mounted bearing rings 16 and 17 respectively with their raceways facing outwardly.

The hub member as shown in Figs. 1, 3 and 4 consists of the two parts 18 and 19 with raceways facing toward each other so that sets of antifriction balls 20 and 21 may be mounted in the respective raceways. The hub part 18 is provided with a tubular extension 22 which fits in the hub part 19 and the shoulder 23 forms an abutment against the inner end of the hub part 19.

The hub part 19 is provided with an angular recess 24 which in the form shown is hexagonal. The particular shape of this angular recess, however, is not material to the broad invention.

In manufacturing the device the parts of the rotor are first assembled and then the hub parts are inserted from opposite sides together with the sets of antifriction balls. The end of the tubular extension 22 is then upset or flanged over to form a head 25 in the recess 24 by a suitable heading operation, parts of the flanged portion being pressed into the corners of the angular recess 10 (see Fig. 2), so that the two parts of the hub are connected together permanently in a manner to prevent relative rotation of one with respect to the other.

These wheels are usually mounted upon a stationary shaft 26 supported in a bracket or hanger 27 or clamped in place by a nut 28. Dust guards or protecting washers 29 and 30 are also usually employed in devices of this character. It will be seen that the hub is of a definite fixed length as determined by the method of manufacture so that a rigid construction is provided of uniform characteristics as determined by the shape and dimensions of the various parts.

In the form shown in Fig. 5 the two hub parts 31 and 32 are exactly alike and each is provided with an angular recess 34 in its outer face to receive the upset end of the inserted tube 33.

In the form shown in Fig. 6 I employ two hub portions 19—19 such as previously described and I support them by a spacing sleeve 35 all three parts being mounted on the tubular member 33 and connected together by the upsetting of the ends in the recesses 24—24.

In the form shown in Fig. 7 the tubular member 36 is formed integral with the spacing sleeve portion 37 and it is intended that bearing hub portions 19 such as previously described will be mounted on the ends of this tubular portion.

I claim:

1. As an article of manufacture, a tubular cone-bearing for a roller skate wheel having a shallow recess in the outer face of its larger end to receive the upset end of a tubular connector, said recess being polygonal in form to interlock with the upset end and prevent relative rotation.

2. As an article of manufacture, a hub construction for a ball bearing roller skate wheel comprising a tubular member, a cone-bearing member on each end of said tubular member and means for securing said tubular member to one of said cone-bearing members and for preventing relative movement therebetween, said means comprising an enlarged face portion on the outer end of the cone-bearing member with a recess in said face portion, the wall of said recess having angular faces adapted to interlock with the upset end of the tubular member.

3. A bearing structure for a skate wheel comprising a tubular hub, a bearing member secured on each end of said hub, at least one bearing member having a polygonal recess in its outer face and the end of the hub being upset in a recess to hold the bearing member in place and to prevent the hub from rotating with respect to the bearing member.

4. A bearing structure for a skate wheel comprising a tubular hub, a bearing secured on each end of said hub, each bearing having a polygonal recess in its outer face and the ends of the hub being upset in the adjacent recesses to hold the bearings in place and to prevent the hub from rotating with respect to the bearings.

5. A bearing structure for a skate wheel comprising a seamless tubular hub, a bearing member secured on each end of said hub, at least one bearing member having a polygonal recess in its outer face and the end of the hub being upset in the recess to hold the bearing member in place and to prevent the hub from rotating with respect to the bearing, the other bearing member being integral with the hub.

6. A ball bearing skate wheel comprising a hub member and a rotor with interposed sets of anti-friction devices, the rotor including outwardly facing bearing rings and the hub member having two connected parts with raceways facing each other and a tubular part, at least one hub part having an angular recess in its outer face and the tubular part being upset into the recess to connect the parts and prevent relative rotation.

7. A skate wheel comprising a rotating member including web portions having interfitting flanges and central recess portions, cup-shaped members in the recess portions, anti-friction balls in the cup-shaped members and a stationary hub member including a tubular member, collar members at each end of the tubular member and provided with tubular portions overlying the outer ends of the tubular member, the outer faces of the collar members being recessed around the central opening, the walls of the recess having angular portions, the outer ends of said tubular hub member being upset and interlocked with the angular wall portions to prevent relative movement of the tubular member and collar members.

8. Improved bearing structure in a wheel for a roller skate having a rotating member including a tread portion and supporting web portion, a stationary hub member and anti-friction balls between said members, said bearing structure comprising a tubular member and collar members on the ends of the tubular member, the face of at least one of said collar members being recessed around its central opening to form a securing seat for the flared end of the tubular member, said collar and a portion of said rotating member forming a raceway for the balls of the wheel.

WILLIAM F. HOERLE.